United States Patent
Dabrowski et al.

(10) Patent No.: US 8,426,478 B2
(45) Date of Patent: Apr. 23, 2013

(54) DEFOAMER FORMULATION

(75) Inventors: Lara Dabrowski, Mannheim (DE);
Frank Menzel, Hanau-Steinheim (DE);
Horst-Werner Wollenweber, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/808,618

(22) PCT Filed: Nov. 24, 2008

(86) PCT No.: PCT/EP2008/066059
§ 371 (c)(1),
(2), (4) Date: Jun. 16, 2010

(87) PCT Pub. No.: WO2009/080428
PCT Pub. Date: Jul. 2, 2009

(65) Prior Publication Data
US 2011/0003921 A1    Jan. 6, 2011

(30) Foreign Application Priority Data
Dec. 20, 2007  (DE) .................. 10 2007 061 455

(51) Int. Cl.
C09K 17/38 (2006.01)
C09K 17/40 (2006.01)
C09K 11/59 (2006.01)
C09D 183/04 (2006.01)

(52) U.S. Cl.
USPC ........... 516/117; 516/113; 516/118; 516/121; 524/261; 524/492; 524/493; 524/500; 524/501; 510/349

(58) Field of Classification Search ............... 524/261, 524/492, 493, 500, 501; 516/117, 113, 118, 516/121; 510/349
See application file for complete search history.

(56) References Cited

U.S. PATENT DOCUMENTS

| | | | |
|---|---|---|---|
| 3,951,853 A * | 4/1976 | Suwala | 516/123 |
| 4,028,218 A | 6/1977 | Fink et al. | |
| 4,384,976 A | 5/1983 | Gruenert et al. | |
| 4,514,319 A * | 4/1985 | Kulkarni et al. | 516/117 |
| 4,655,960 A | 4/1987 | Wuhrmann et al. | |
| 5,599,481 A * | 2/1997 | Walger | 516/79 |
| 5,658,852 A * | 8/1997 | Murphy et al. | 504/362 |
| 5,976,701 A * | 11/1999 | Barancyk et al. | 428/423.1 |
| 6,353,068 B1 | 3/2002 | Dietz et al. | |
| 6,656,975 B1 | 12/2003 | Christiano et al. | |
| 2004/0146475 A1* | 7/2004 | Peffly et al. | 424/70.13 |
| 2005/0113261 A1* | 5/2005 | Huber et al. | 507/117 |
| 2007/0112078 A1* | 5/2007 | Procter et al. | 516/117 |
| 2007/0145327 A1 | 6/2007 | Lortz et al. | |
| 2008/0021152 A1* | 1/2008 | Rautschek et al. | 524/588 |
| 2009/0137446 A1* | 5/2009 | Rautschek et al. | 510/347 |

FOREIGN PATENT DOCUMENTS

| | | |
|---|---|---|
| DE | 27 45 583 | 4/1979 |
| JP | 2005-525931 | 9/2005 |
| JP | 2005-279565 | 10/2005 |
| WO | 03 029338 | 4/2003 |
| WO | WO 03/099413 | 12/2003 |
| WO | 2004 089825 | 10/2004 |

OTHER PUBLICATIONS

Japanese Office Action in Japanese Application No. 2010-538532, dated Dec. 7, 2012. (w/English Translation).

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

Formulation comprising hydrophobicized particles of silicon dioxide, mineral oil and one or more emulsifiers, where the hydrophobicized silicon dioxide is a fumed silicon dioxide, possesses a BET surface area of 200 to 300 m$^2$/g, has on the surface of the particles O—Si—$(C_nH_{2n+1})_3$ groups, where n is 1 to 3 and where the $(C_nH_{2n+1})$ units are alike or different, has a carbon content of 1.5% to 5% by weight, based on the hydrophobic silicon dioxide, and is present in the formulation with a fraction of 0.05% to 5% by weight.

13 Claims, 1 Drawing Sheet

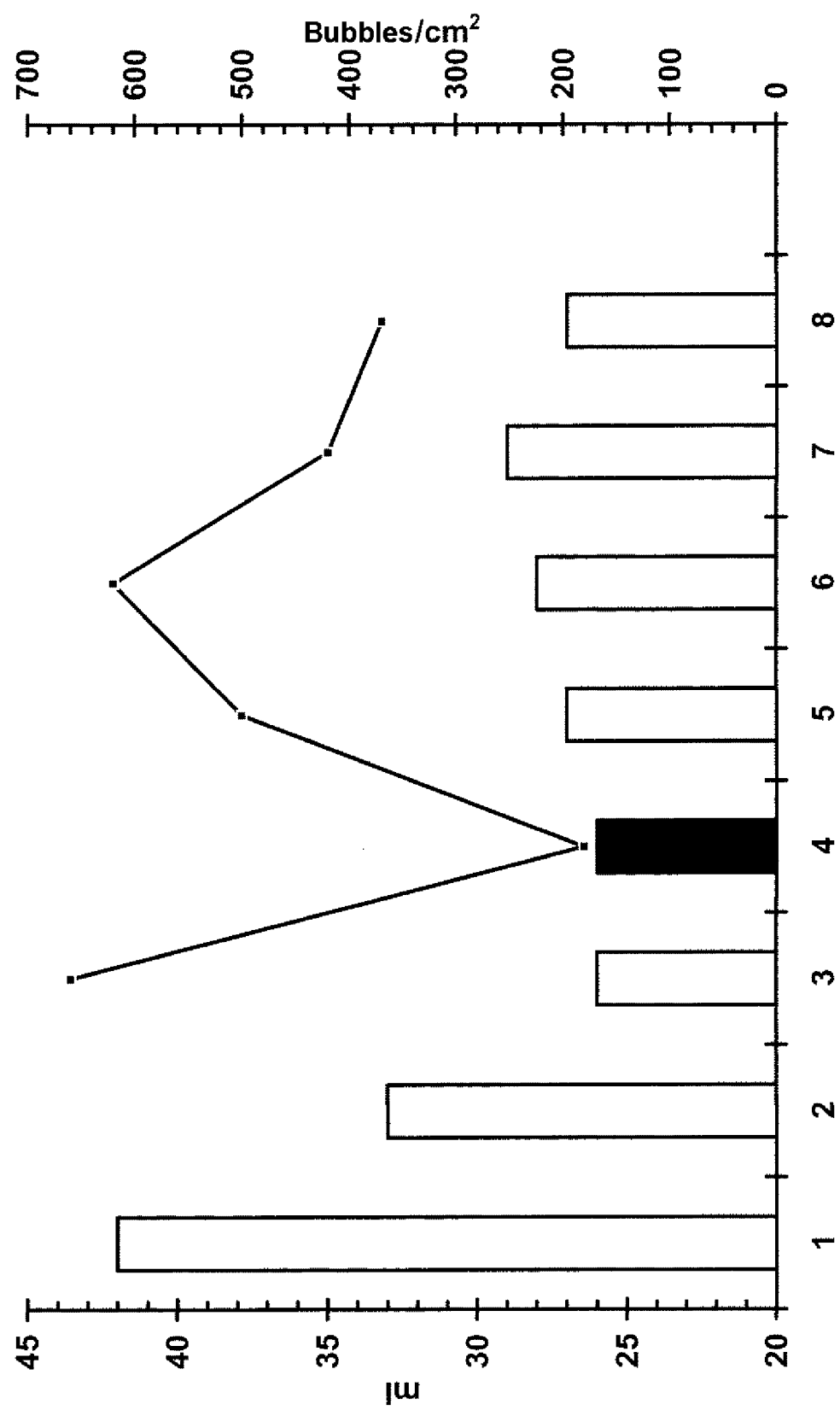

DEFOAMER FORMULATION

The invention relates to a defoamer formulation and to its use.

The use of hydrophobic silicon dioxide powders, more particularly those which are of pyrogenic origin (fumed), in defoamer formulations is known. Mention may be made, by way of example, of DE-A-282906, U.S. Pat. No. 4,377,493, DE-A 3411759, U.S. Pat. No. 4,344,858, WO95/05880 or DE-A-10138491. The effect of the hydrophobic silicon dioxide powders in such systems is generally to stabilize the defoamer formulation (acting as a sedimentation preventative) and to destroy more or less all of the foam. In this context it is observed that, depending on the medium in which the defoamer formulation is employed, the destruction of the foam is incomplete, the majority of the destruction involving macrobubbles. Microbubbles, in contrast, are destroyed to a far lesser extent, and this may significantly lessen the quality of a coating, for example.

The object of the present invention was therefore to find a defoamer formulation with which the number of microbubbles can be reduced.

It has now surprisingly been found that this object is achieved through a formulation comprising hydrophobicized particles of silicon dioxide, mineral oil and one or more emulsifiers, wherein the hydrophobicized silicon dioxide
- is a fumed silicon dioxide,
- possesses a BET surface area of 200 to 300 m$^2$/g,
- has on the surface of the particles O—Si—$(C_nH_{2n+1})_3$ groups, where n is 1 to 3 and where the $(C_nH_{2n+1})$ units are alike or different,
- has a carbon content of 1.5% to 5% by weight, based on the hydrophobic silicon dioxide, and
- is present in the formulation with a fraction of 0.05% to 5% by weight.

Fumed silicon dioxide particles are those obtained by flame oxidation and/or flame hydrolysis. Starting materials used for pyrogenic (fuming) processes may be organic and inorganic substances. Particularly suitable, for example, is silicon tetrachloride. Suitable organic starting compounds may for example be Si(OR)$_4$ with R=CH$_3$ or CH$_2$CH$_3$. The silicon dioxide particles obtained in this way are very largely pore-free and have free hydroxyl groups on the surface. The silicon dioxide particles are entirely or very largely in aggregated form.

The particles thus obtained are next subjected to a hydrophobicizing step. In this step O—Si—$(C_nH_{2n+1})_3$ groups are formed on the surface of the fumed silicon dioxide particles, where n is 1 to 3 and where the $(C_nH_{2n+1})$ units are alike or different. In the case of the hydrophobicized silicon dioxide powder present in the formulation of the invention, n may preferably be 1.

The BET surface area of the hydrophobicized silicon dioxide powder is 200 to 300 m$^2$/g. The hydrophobicized silicon dioxide present in the formulation of the invention may preferably have a BET surface area of 230 to 290 m$^2$/g and more preferably 250 to 270 m$^2$/g.

The carbon content of the hydrophobicized silicon dioxide is generally 1% to 5% by weight, preferably 2% to 3% by weight, based in each case on the hydrophobic silicon dioxide.

Particular preference is given to a hydrophobicized silicon dioxide which carries O—Si—(CH$_3$)$_3$ groups on the surface, has a BET surface area of 230 to 290 m$^2$/g and has a carbon content of 2% to 3% by weight, based on the hydrophobic silicon dioxide. A commercially available hydrophobicized silicon dioxide which exhibits these features is, for example, Aerosil® R812, Evonik Degussa GmbH.

The fraction of hydrophobicized silicon dioxide in the formulation of the invention is 0.05% to 5.0% by weight. Preferably the fraction may be 0.1% to 0.5% by weight.

A further component of the formulation of the invention is a mineral oil of the type typically used in defoamer formulations. The fraction of the mineral oil is preferably 40% to 90% by weight, based on the formulation.

Further components of the formulation of the invention are emulsifiers of the kind typically used in defoamer formulations. The fraction of the emulsifiers is preferably 2% to 25% by weight, based on the formulation.

The formulation of the invention may further comprise silicone oils, polyethersiloxanes and/or water.

The invention further provides for the use of the formulation of the invention for defoaming aqueous, polymeric systems based on acrylic esters.

EXAMPLE

TABLE 1

Fumed hydrophobicized silicon dioxides

| AEROSIL ®*) | Hydrophilic SiO$_2$ basis [m$^2$/g] | Hydrophobicizing agent | BET surface area [m$^2$/g] | C Content [% by weight] |
|---|---|---|---|---|
| R 106 | 300 | D4**) | 250 ± 30 | 1.5-3.5 |
| R 816 | 200 | hexadecyl-silane | 190 ± 20 | 0.9-1.8 |
| R 972 | 130 | dimethyl-dichloro-silane | 110 ± 20 | 0.6-1.2 |
| R 812 | 300 | hexamethyl-disilazane | 260 ± 30 | 2.0-3.0 |
| R 974 | 200 | dimethyl-dichloro-silane | 170 ± 20 | 0.7-1.3 |
| R 8200 | 200 | hexamethyl-disilazane | 160 ± 25 | 2.0-4.0 |

*)Evonik Degussa;
**)octamethylcyclotetrasiloxane

TABLE 2

Dispersion of hydrophobicized silicon dioxide in mineral oil

| | % by weight |
|---|---|
| Risella 917* | 97.0 |
| Hydrophobicized SiO$_2$ | 3.0 |
| Total | 100.0 |

*Mineral oil

TABLE 3

Emulsifier mixture

| | % by weight |
|---|---|
| Polyethylene glycol 600 monooleate* | 6.4 |
| Polyethylene glycol 600 dioleate* | 24.4 |
| Polypropylene oxide 1000 | 69.2 |
| Total | 100.0 |

*Nopco Paper Technology, Drammen, Norway

TABLE 4

| Formulation | |
|---|---|
| | % by weight |
| Dispersion | 56.8 |
| Al stearate [1] | 1.5 |
| Emulsifier mixture | 18.2 |
| Dispersion | 11.0 |
| Dispersion | 11.0 |
| Silicone oil [2] | 0.5 |
| Polyethersiloxane [3] | 1.0 |
| Total | 100 |

[1] LIGA TR;
[2] DC 200/100 cSt;
[3] LA-E-1143, Tego

First of all, using an Ultra-Turrax (10 min, 10 000 revolutions), a dispersion of mineral oil and hydrophobicized silicon dioxide was prepared.

Separately from this an emulsifier mixture was prepared by mixing of the constituents in Table 3.

The formulation as per Table 4 was obtained by mixing of the stated components.

The aqueous acrylic ester system used was Primal® EP 2596 from Rohm and Haas.

Determination of defoaming behaviour:

a) Macrofoam: 80 weight fractions of Primal® EP 2596 are diluted with 20 weight fractions of water and then homogenized with a dissolver at a low shear rate over a period of 10 minutes. A 100 ml glass beaker is charged with 30 g of this mixture and 0.5% by weight of fumed, hydrophobicized silicon dioxide and the resulting mixture is homogenized using a Dispermat LC-2 dissolver with a 2.5 mm toothed disc at 1000 rpm for one minute. The dissolver should be placed 1 cm above the base of the vessel.

Thereafter the mixture is treated at 3000 rpm for a period of one minute and immediately thereafter a 25 g sample is placed in a 50 ml volumetric cylinder and the volume is ascertained.

b) Microfoam: in addition, a count was conducted of the air bubbles enclosed in a dry coat, using a microscope.

FIG. 1 shows the volume of the macrofoam (bars) and the number of enclosed air bubbles (microfoam) as a function of hydrophobicized silicon dioxides, the reference numerals having the following definitions: 1=no defoamer, 2=no hydrophobicized silicon dioxide, 3=Aerosil® R106; 4=Aerosil® R812, 5=Aerosil® R816, 6=Aerosil® R972, 7=Aerosil® R974, 8=Aerosil® R8200. The example with Aerosil® R812 is inventive; the others serve as comparative examples.

The inventive Example 4 shows the best defoamer action in relation to macrofoam and microfoam.

The invention claimed is:

1. A formulation consisting of hydrophobicized particles of silicon dioxide, mineral oil and one or more emulsifiers, wherein
    the hydrophobicized particles of silicon dioxide
        are fumed,
        possesses a BET surface area of 200 to 300 $m^2/g$,
        have on the surface of the particles O—Si—$(C_nH_{2n+1})_3$ groups, where n is 1 to 3 and where the $(C_nH_{2n+1})$ units are alike or different,
        have a carbon content of 1.5% to 5% by weight, based on the hydrophobicized particles of silicon dioxide, and
        are present in the formulation in an amount of from 0.05% to 5% by weight, based on the total weight of the formulation,
    wherein the formulation comprises:
        40% to 90% by weight, based on the total weight of the formulation, of the mineral oil, and
        2% to 25% by weight, based on the total weight of the formulation, of the emulsifier.
2. The formulation according to claim 1, wherein n is 1.
3. The formulation according to claim 1, wherein the BET surface area is 230 to 290 $m^2/g$.
4. The formulation according to claim 1, wherein the carbon content is 2% to 5%, based on the hydrophobicized particles of silicon dioxide.
5. The formulation according to claim 1, wherein the fraction of hydrophobicized silicon dioxide is 0.1% to 1% by weight, based on the formulation.
6. The formulation according to claim 1, wherein the BET surface area is 250 to 270 $m^2/g$.
7. The formulation according to claim 1, wherein the carbon content is 2% to 3% by weight, based on the hydrophobicized particles of silicon dioxide.
8. The formulation according to claim 1, which contains 0.1% to 0.5% by weight of the hydrophobicized particles of silicon dioxide, based on the total weight of the formulation.
9. The formulation according to claim 1, wherein the $(C_nH_{2n+1})$ units are alike.
10. The formulation according to claim 1, wherein the $(C_nH_{2n+1})$ units are different.
11. The formulation according to claim 1, wherein the carbon content is 2% to 3% by weight, based on the hydrophobicized particles of silicon dioxide.
12. A composition comprising the formulation according to claim 1 and at least one acrylic ester.
13. A method of defoaming aqueous systems comprising adding the formulation according to claim 1 to an aqueous polymeric system comprising an acrylic ester.

* * * * *